Nov. 27, 1934.  R. A. WILKINS  1,982,587
ELECTROLYTIC FOIL
Original Filed Jan. 12, 1929
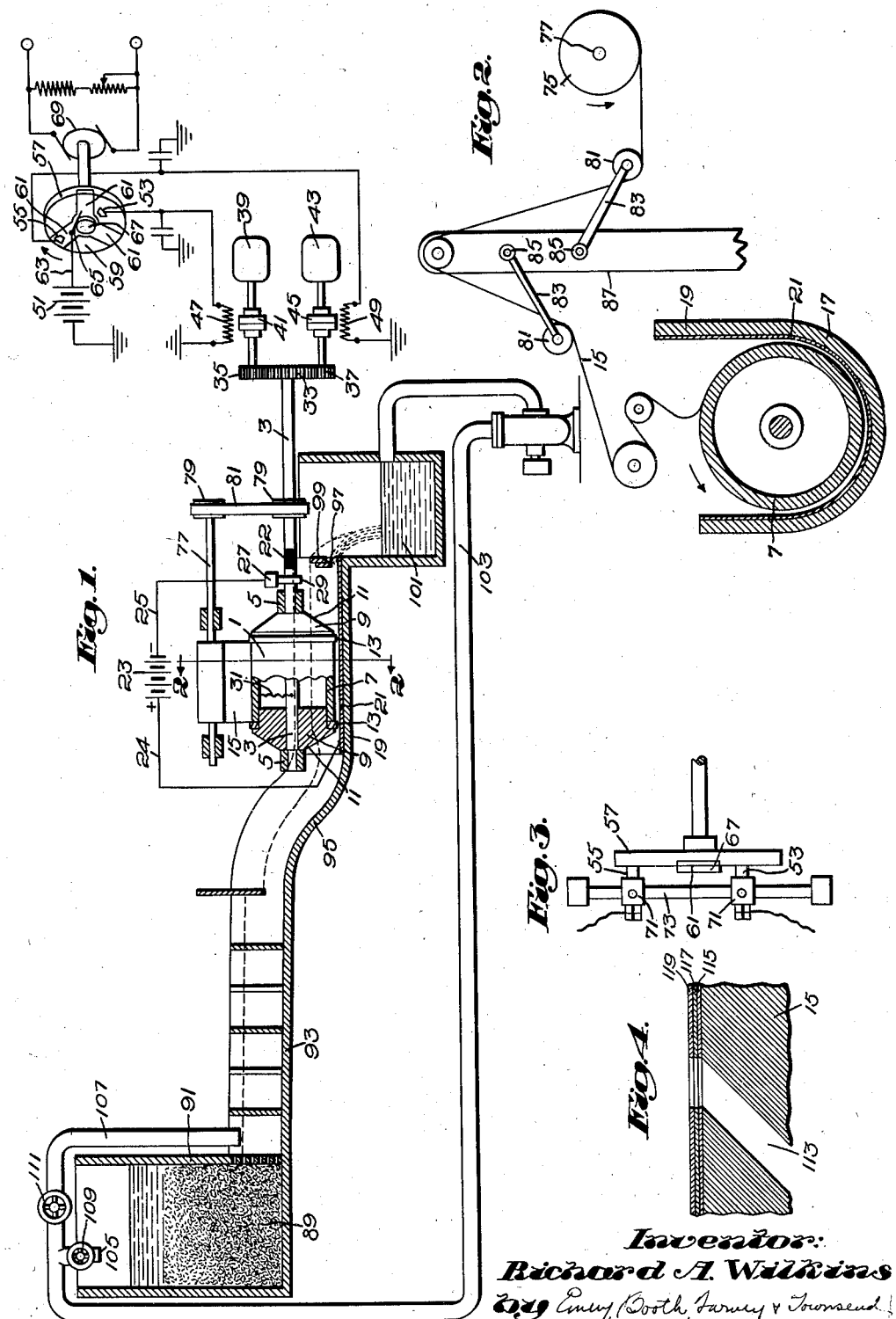
Inventor:
Richard A. Wilkins
by Emery, Booth, Varney & Townsend
Attys Patented Nov. 27, 1934

1,982,587

UNITED STATES PATENT OFFICE 1,982,587

ELECTROLYTIC FOIL

Richard A. Wilkins, Beverly, Mass., assignor to Industrial Development Corporation, Salem, Mass., a corporation of Maine Original application January 12, 1929, Serial No. 332,108. Divided and this application May 2, 1929, Serial No. 359,773. Renewed August 24, 1932

2 Claims. (Cl. 204—6)

My invention pertains to improvements in metal foil, and particularly, but not exclusively, to so-called "webs" or "web stock" consisting of foil as such produced by electro-deposition.

The invention will be best understood from the following descriptions of several examples of foils according to the invention, and of examples of methods of and apparatus for making the foils, while the scope of the invention will be more particularly pointed out in the appended claims.

In the drawing:—

Fig. 1 schematically illustrates one example of apparatus for use in making the foil;

Fig. 2 is a section on the line 2—2 of Fig. 1;

Fig. 3 illustrates a detail; and

Fig. 4 illustrates schematically a fragmentary section of one example of foil according to the invention.

The method of and apparatus herein described for making the foil in the form of web stock form the subject matter of my co-pending application Serial No. 332,108, filed January 12, 1929, (now Patent No. 1,820,204, dated August 25, 1931), of which the present application is a division, but it will be understood that this web stock or foil may be made by other methods and apparatus as, for example, those disclosed in my co-pending application Serial No. 513,858, filed February 6, 1931, (now Patent No. 1,969,054, dated August 7, 1934).

Referring to the drawing, I have shown a drum 1 carried by a shaft 3, the latter mounted in bearings 5 so that the drum may be rotated. As illustrated, the drum comprises a sleeve 7 of copper or other material providing a conductive surface, which sleeve at opposite ends thereof is carried by members 9 non-rotatably mounted on the shaft, these members preferably formed to provide frusto-conical end surfaces 11 for the drum and being of non-conductive material such as wood, porcelain, or the like. As shown, the drum is provided with rings 13 of rubber, or other non-conductive material, which closely abut the ends of the sleeve 7 so that the metal sheet 15 which is deposited on the sleeve, as will hereinafter be described, will be formed with uniform unbroken edges.

Herein, the surface of the sleeve 7 constitutes a cathode on which the sheet 15 of material to be formed is deposited from the electrolyte. For facilitating stripping the sheet from the surface of the cathode, the latter preferably is coated with amalgam, which amalgam may be composed of such proportions of mercury and tin as to form a rather soft mass permitting the surface of the cathode to be rubbed with it after the former is finished to form a smooth surface, and is cleaned,—say with a potassium cyanide solution.

As shown, the drum is mounted coaxially with the semicircular bottom 17 of an electrolyte conveying trough 19, said trough herein lined with a sheet 21 of lead in proximity with the cathode surface, so that said sheet may constitute an insoluble anode cooperating with the cathode surface. As shown, the shaft 3 is provided with an insulating coupling, schematically indicated at 22, which coupling isolates the portion of the shaft adjacent the cathode from the remaining portions thereof. A source of low potential, direct current, electromotive force of high current capacity, schematically indicated by the battery 23, has its positive terminal connected to the insoluble anode 21 by a conductor 24 and its negative terminal connected to the cathode by a conductor 25 in electrical communication with a brush 27, the latter cooperating with a ring 29 of conductive material mounted on the shaft 3, while the shaft is placed in electrical communication with the sleeve 7 by a conductor 31.

As shown, mechanism is provided for reciprocating the cathode surface in opposite directions by giving the shaft 3 an oscillatory movement, this oscillatory movement being relatively rapid and moving the drum through a greater angle in one direction than the other, so that there is effected a relatively rapid motion between the electrolyte and cathode with a resultant motion which rotates the cathode relatively slowly in one direction.

Herein, for oscillating the shaft 3, the same is provided with a spur gear 33 which at opposite sides thereof meshes with pinions 35 and 37 respectively, the pinion 35 being driven by a motor 39 through an electro-magnetic clutch 41, while the pinion 37 is driven by a similar motor 43 through a similar electro-magnetic clutch 45. It will be observed that if the motors 39 and 43 rotate at the same speed in opposite directions, the shaft 3 will be rotated in one direction when the clutch 41 is in engaged condition, and in the opposite direction when the clutch 45 is in engaged condition, and that by alternately causing engagement of the two clutches, and keeping one clutch in engagement for a longer period than the other, the shaft will be oscillated with movement through a greater angle in one direction than in the other.

As illustrated, the electro-magnetic clutches 41 and 45 have energizing windings schematically indicated by the inductance coils 47 and 49. As shown in Fig. 1, the left hand terminals of the coils 47 and 49 are in electrical communication with the left hand terminal of a source of electromotive force indicated by the battery 51, while the opposite terminals of these coils, respectively, are in electrical communication with the brushes 53 and 55, cooperating with a distributor 57. As schematically indicated in Fig. 1, the distributor comprises a disk 59 of non-conductive material carrying a contact system comprising the three radially disposed arms 61, the latter being placed in electrical communication with the right hand terminal of the source of electromotive force 51 by means of a conductor 63 connected to a brush 65 in contact with the distributor hub 67 from which radiate the distributor contacts 61. Conveniently the distributor may be rotated by an electric motor schematically indicated at 69.

It will be observed, that as the distributor 57 is rotated, the brushes 53 and 55 will alternately contact with the radial arms 61 of the distributor, so as alternately to energize the electromagnetic clutches 41 and 45. By positioning the brushes 53 and 55 at different radial distances from the axis of rotation of the distributor, one clutch will be energized for a longer time than the other. Conveniently the brushes 53 and 55 may be mounted in brush holders 71 (Fig. 3) adjustably mounted for sliding movement longitudinally of a support 73, so that the radial distances of the brushes 53 and 55 from the axis of the distributor may be varied, and thus vary the amplitude in each direction of the oscillatory or reciprocatory movement of the cathode surface. As shown, the motor 69 which drives the distributor is indicated as of the shunt wound type with a rheostat in the field winding, so as to enable the speed of the motor to be varied, by which means for a given setting of the brushes 53 and 55 the resultant speed of rotation of the cathode may be varied.

Herein, for stripping the sheet 15 from the cathode surface, provided by the cylinder 7, I have provided a reel 75 mounted on a shaft 77, which shaft is geared to the shaft 3 by the pulleys 79 mounted on the respective shafts and connected by the belt 81. As shown, the reel 75 will oscillate with the drum 1, and to prevent undue strains being placed on the sheet 15, and to compensate for any discrepancies in movement between the drum and reel, light weight tension pulleys 82 are provided, which pulleys are shown as mounted on arms 83 pivoted at 85 to a vertical support 87. For convenience, and simplicity of illustration, no attempt has been made to show, other than schematically, the details of the stripping mechanism in the schematic arrangement of apparatus illustrated by Fig. 1, and it is believed that Fig. 2 illustrates the details of this particular mechanism with sufficient particularity in respect to the form of apparatus employed.

Herein, the electrolyte is caused to flow in a continuous stream, preferably swiftly, through the trough 19, the electrolyte being circulated through a mass 89 of electrolyte replenishing material contained in a tank 91. As shown, the electrolyte leaving the tank 91 passes through a conduit 93 and hence down an incline 95 to the trough 19, the head between the tank and trough giving the electrolyte considerable velocity as it passes through the latter. The surface of the liquid in the trough preferably is maintained approximately horizontal, or parallel to the longitudinal axis of the drum 1, by use of an underflow gate 97 and wier 99, both of which conveniently may be mounted for adjustable movement in a vertical direction. The electrolyte passing through the trough 19, as shown falls into a tail-stock 101, whence it is pumped through a pipe 103 to discharge through an outlet 105 into the tank 91, a by-pass connection 107 being provided for by-passing any desired portion of the electrolyte around the tank, the outlet 105 and by-pass connection 107 respectively provided with the valves 109 and 111 for enabling this result to be secured.

The invention is applicable to forming sheets of metals which may be electro-deposited from aqueous solutions of their salts. I have found the invention particularly adapted for making copper foil, say material in the order of 0.0002 inches in thickness, although, dependent somewhat upon economic considerations, much thicker material, say material having a thickness in the order of 0.01 inches, may be made by it. Heretofore copper foil has been made by a mill process comprising alternate rolling and annealing, but by this prior process it is impossible economically to produce copper foil less than about 0.001 inches in thickness.

The copper foil produced by the present invention I have found is superior in many respects to foil produced by the usual rolling processes, particularly in that its tensile strength is uniform in all directions from points on its surface, the rolled material, as will be understood by those skilled in the art, being of high tensile strength in the direction of the "grain" and of very much reduced tensile strength in directions transverse to the grain. Although the material made according to the present process may, in some instances, have a slightly lower tensile strength than that in the direction of the grain of foil produced by prior processes, it has a much higher tensile strength than the mean tensile strength of the latter. Copper foil produced by the present invention is distinguished in one aspect from electro-deposited metals heretofore produced in that it has the high degree of malleability and ductility commonly associated with forged and rolled metals as distinguished from the lack of these properties in electro-deposited copper heretofore produced. This difference is believed to be due to the difference in the nature of the so-called "crystal boundaries" of the metals or the so-called "amorphous cement" bonding the crystals.

As an example of one manner of producing the foil, but without limitation thereto, I have found that satisfactory results may be obtained with a cathode surface 9 inches long and 12 inches in diameter spaced five-eighths of an inch from the adjacent surface of the insoluble anode, and immersed, through an angle of about 120 degrees, in the electrolyte, the latter flowing at the rate of about 300 gallons per minute, where the angular oscillatory movements of the cathode surface in opposite directions vary from 65 degrees in one direction and 60 degrees in the other direction to from 35 degrees in one direction and 30 degrees in the opposite direction, with twenty oscillations per minute, the latter resulting in one revolution of the cathode in 3.6 minutes. The electrolyte replenishing material employed in this example consists of about thirty pounds of #10 mesh jig concentrate Lake copper, placed in the tank for electrolyte replenishing material, the by-pass valves for controlling the metal content of the electrolyte being regulated to maintain the copper sulphate ($CuSO_4.5H_2O$) concentration between 20 and 36 ounces per gallon of solution, and the sulphuric acid concentration between 16 and 8 ounces of commercial 66 degrees Baumé acid per gallon of solution.

I have found that the thickness of the foil may be regulated by varying either the resultant speed of revolution of the cathode surface, or, with a given number of oscillations per minute, by varying the difference in amplitude in opposite directions of the oscillations. For example, at twenty oscillations per minute, and at a current density of about 200 amperes per square foot, a 9 degrees difference in amplitude will produce, in the above example of the practice of the invention, foil of about 0.0002 inches in thickness, and, a 2½ degrees difference, foil of about 0.0006 inches in thickness. The rate of deposition also is affected by the current density, and I have found that by passing the electrolyte past the cathode in a swiftly flowing stream, while reciprocating the cathode transversely relative to the stream, high current densities, say for example from 200 to 300 amperes per square foot, may be employed without "burning" the metal deposited.

Under some conditions of use of the product, say when the foil is used for making electrical condensers, it may be of advantage to have it minutely perforated, which I have found conveniently may be effected by maintaining a relatively high hydrogen ion concentration of the electrolyte, say by using an electrolyte having a sulphuric acid concentration of 30 ounces, 66 degrees Baumé, per gallon of electrolyte in the above example of the practice of the invention. The perforations of the foil so produced are for the most part inclined as indicated at 113 in Fig. 4.

The perforations of the foil above described have a marked effect on its density, without for many uses affecting its suitability as compared to imperforate foil. For example, copper foil 0.0002 inches in thickness having about 1000 microscopic perforations per square inch, said perforations in the order of 0.00005 inches diameter, has an observed area of about 21,000 square inches per pound, while imperforate foil of the same thickness has an area of about 15,000 square inches per pound. In other words, this perforated foil will cover about 40% more area per pound than the imperforate foil. I have found that the effect of the perforations decreases with the thickness of the foil, and that the effect is most marked in foils less than 0.0005 inches in thickness. With foil 0.001 inches in thickness the increase in observed area per pound is about 20% as compared to imperforate foil. Roughly the perforated foil produced as above described may vary from 0.0002 inches in thickness with 40% greater observed area per pound, as compared to imperforate foil, to 0.005 inches in thickness with 5% increase in area per pound.

For some conditions of use of the product, it is desirable to have the foil coated with soldering material, and conveniently for this purpose I electrolytically deposit soldering material on the sheets of foil, after they are produced as above described. With copper foil conveniently this may be done by first depositing on the sheets a layer 115 of electrolytic tin, say by cleaning the sheets and then guiding them through an electrolytic cell containing a stannous chloride electrolyte, the sheets being made the cathode of such cell. After the tin deposit is formed, the sheets may be washed and a coating 117 of lead deposited thereon in a similar manner, using lead fluoro-silicate as an electrolyte. If desired, a second layer 119 of tin may be applied for producing a surface less susceptible to oxidization than a lead surface. These alternate layers of tin and lead, which may be applied to both sides of the copper foil, will form a soldering alloy when heat is applied to the foil, enabling the foil readily to be soldered. When the material is to be used for fabricating electrical condensers, or in other situations where it is undesirable to employ a flux for soldering, the layers of tin and lead may consist of no more than a "blush" of these materials, say as will be produced by causing each portion of the sheets to remain in the stannous chloride baths about 5 seconds and in the lead fluoro-silicate bath about 10 seconds, in which case sheets placed in contact may be soldered to each other by dipping them at their edges in molten solder. In cases where it is desired to avoid the dipping operation the thickness of the lead and tin layers may be increased, say by allowing the sheets to remain in the baths four or five times as long, in which case sheets placed in contact may be soldered by applying heat, say by application of a hot iron, to the points to be soldered, with or without the use of flux, as found most expedient.

It has been found that corrosion of copper foil may be effectively prevented by giving it a blush of tin as above described, and where alternate layers of tin and lead are applied preferably, for this purpose, the outer layer is of tin. When employed for condensers impregnated with wax, commonly chlorinated naphthalene, which will corrode copper but not tin, the tin layer is exceptionally useful.

It will be understood that my invention is not limited to the specific embodiments of apparatus, method, and product above described, but that within the scope of the invention wide deviations may be made from these without departing from the spirit of the invention.

I claim:

1. As an article of manufacture, web stock consisting of indefinitely long continuous lengths of electro-deposited metal foil as such from 0.0002 to 0.001 inches in thickness and having a multitude of minute perforations in the order of 0.00005 inches in diameter.

2. As an article of manufacture, web stock consisting of indefinitely long continuous lengths of electro-deposited copper foil as such from 0.0002 to 0.001 inches in thickness and having a multitude of minute perforations in the order of 0.00005 inches in diameter.

RICHARD A. WILKINS.